United States Patent
Lo et al.

(10) Patent No.: US 9,264,228 B2
(45) Date of Patent: Feb. 16, 2016

(54) SYSTEM AND METHOD FOR A SECURE DISPLAY MODULE

(71) Applicants: Chi Wah Lo, Hong Kong (HK); Hwai Sian Tsai, Hong Kong (HK)

(72) Inventors: Chi Wah Lo, Hong Kong (HK); Hwai Sian Tsai, Hong Kong (HK)

(73) Assignee: BBPOS Limited, Hong Kong (HK)

( * ) Notice: Subject to any disclaimer, the term of this patent is extended or adjusted under 35 U.S.C. 154(b) by 0 days.

(21) Appl. No.: 14/178,174

(22) Filed: Feb. 11, 2014

(65) Prior Publication Data

US 2014/0226815 A1    Aug. 14, 2014

Related U.S. Application Data

(60) Provisional application No. 61/764,584, filed on Feb. 14, 2013.

(51) Int. Cl.
| | |
|---|---|
| *H04L 29/06* | (2006.01) |
| *H04L 9/08* | (2006.01) |
| *G06F 21/44* | (2013.01) |
| *G06F 21/84* | (2013.01) |
| *H04L 9/32* | (2006.01) |

(52) U.S. Cl.
CPC ............ *H04L 9/0866* (2013.01); *G06F 21/445* (2013.01); *G06F 21/84* (2013.01); *G06F 2221/031* (2013.01); *H04L 9/3273* (2013.01)

(58) Field of Classification Search
CPC .................................................... H04L 9/0866
See application file for complete search history.

(56) References Cited

U.S. PATENT DOCUMENTS

| | | | | |
|---|---|---|---|---|
| 5,493,613 | A * | 2/1996 | Denno .................... | G06F 21/31 235/379 |
| 6,222,926 | B1 * | 4/2001 | Cavallerano et al. ......... | 380/214 |
| 6,549,194 | B1 * | 4/2003 | McIntyre et al. ............. | 345/173 |
| 7,298,850 | B2 * | 11/2007 | Whytock .................. | G07F 7/10 380/226 |
| 7,945,785 | B2 * | 5/2011 | Castaldi et al. ............... | 713/183 |
| 8,456,429 | B2 * | 6/2013 | Whytock ............ | G06F 3/04886 345/156 |
| 2002/0062445 | A1 * | 5/2002 | Owada et al. .................. | 713/193 |
| 2002/0169959 | A1 * | 11/2002 | Hsu .............................. | 713/169 |
| 2003/0037237 | A1 * | 2/2003 | Abgrall et al. ................ | 713/166 |
| 2004/0199628 | A1 * | 10/2004 | Wu ............................... | 709/224 |
| 2009/0119514 | A1 * | 5/2009 | Sawada ......................... | 713/189 |
| 2010/0283586 | A1 * | 11/2010 | Ikeda et al. ................. | 340/10.42 |
| 2012/0095919 | A1 * | 4/2012 | Hart ....................... | G06Q 20/12 705/44 |
| 2013/0103190 | A1 * | 4/2013 | Carapelli ................ | G06F 21/82 700/237 |

\* cited by examiner

*Primary Examiner* — Mohammad L Rahman
(74) *Attorney, Agent, or Firm* — Howison & Arnott, LLP

(57) ABSTRACT

A system for a secure display module includes a display element array, a driver controller, a communication interface, a host controller and a cryptographic engine. The display element array includes one or more segments, and the driver outputs are configured to drive the one or more segments, respectively. The host controller is configured to send commands and data to the driver controller via the communication interface and the cryptographic engine is configured to encrypt communication data between the display element array and the host controller.

14 Claims, 3 Drawing Sheets

SYSTEM AND METHOD FOR A SECURE DISPLAY MODULE

CROSS REFERENCE TO RELATED CO-PENDING APPLICATIONS

This application claims the benefit of U.S. provisional application Ser. No. 61764584 filed on Feb. 14, 2013 and entitled SYSTEM AND METHOD FOR A SECURE DISPLAY MODULE, which is commonly assigned, and the contents of which are expressly incorporated herein by reference.

FIELD OF THE INVENTION

The present invention relates to a system and a method for a secure display module.

BACKGROUND OF THE INVENTION

There are many different display technologies available today. For example, in dot-matrix liquid crystal display (LCD) units, there is a grid of display elements pixels. In some other display modules, the display elements are made up of arrays of Light-emitting diodes (LEDs). In simpler displays, seven-segment, fourteen-segment, or sixteen-segment display units are used. There are even mechanical flip disc signs that can display images or text messages. In all the above examples, a controller is used to drive the display elements. For example, in LCDs, electronic controller driver integrated circuit (IC) is used to drive the liquid crystal display pixel on and off. This controller accepts a set of commands from a host microcontroller or processor that control the image or text to display. By tapping at the communication interface and reading the stream of commands, it is possible to deduce the image or message displayed.

In some applications, the information displayed is sensitive and it is desirable to protect the displayed information by making the communication channel between the display controller and the host controller secure, thereby making the commands incomprehensible. For example, in a payment application, by making the display unit secure, more information can be displayed and this simplifies the design of the other components. Accordingly, there is a need for a secure display module that can greatly simplify the design and reduce the cost of a secure application and products.

SUMMARY OF THE INVENTION

The invention presents a secure display module where the display controller includes a cryptographic engine to encrypt the commands sent to and from a host controller. By making the display secure, the design of a secure application can be greatly simplified.

In general, in one aspect, the invention provides a system for a secure display module including a display element array, a driver controller, a communication interface, a host controller and a cryptographic engine. The display element array includes one or more segments, and the driver outputs are configured to drive the one or more segments, respectively. The host controller is configured to send commands and data to the driver controller via the communication interface and the cryptographic engine is configured to encrypt communication data between the display element array and the host controller.

Implementations of this aspect of the invention may include one or more of the following features. Information displayed on the display element array comprises the commands and data sent from the host controller. The cryptographic engine stores one or more identification tokens for mutual authentication with the host controller. The cryptographic engine stores one or more cryptographic keys for cryptographic operations comprising one or more of data encryption, authentication, digital signature, or hashing. The one or more cryptographic keys may be fixed key, master-session key or Derived Unique Key Per Transaction (DUKPT). The display element array further includes elements comprising light-emitting diodes, seven-segment, fourteen-segment, sixteen-segment display elements, or mechanical flip disc display elements. The elements are in the form of pixels, line segments or icons. The system further includes a Personal Identification Number (PIN) pad and an application configured to display a randomized number grid in the display element array, and the PIN pad is used to enter positional information corresponding to the randomized number grid. The positional inputs on the PIN pad are configured to be sent to the display module and the display module is configured to decode the positional inputs into PIN digits and to generate an encrypted PIN and then to send the encrypted PIN back to the PIN pad.

In general, in another aspect, the invention provides a method for a secure display module including the following. First, providing a display element array comprising one or more segments. Next, providing a driver controller comprising driver outputs configured to drive the one or more segments, respectively. Next, providing a communication interface and a host controller configured to send commands and data to the driver controller via the communication interface. Next providing a cryptographic engine configured to encrypt communication data between the display element array and the host controller.

Among the advantages of this invention may be one or more of the following. By making the display secure, the design of a secure application can be greatly simplified.

The details of one or more embodiments of the invention are set forth in the accompanying drawings and description below. Other features, objects and advantages of the invention will be apparent from the following description of the preferred embodiments, the drawings and from the claims.

DETAILED DESCRIPTION OF THE INVENTION

Figure 1:
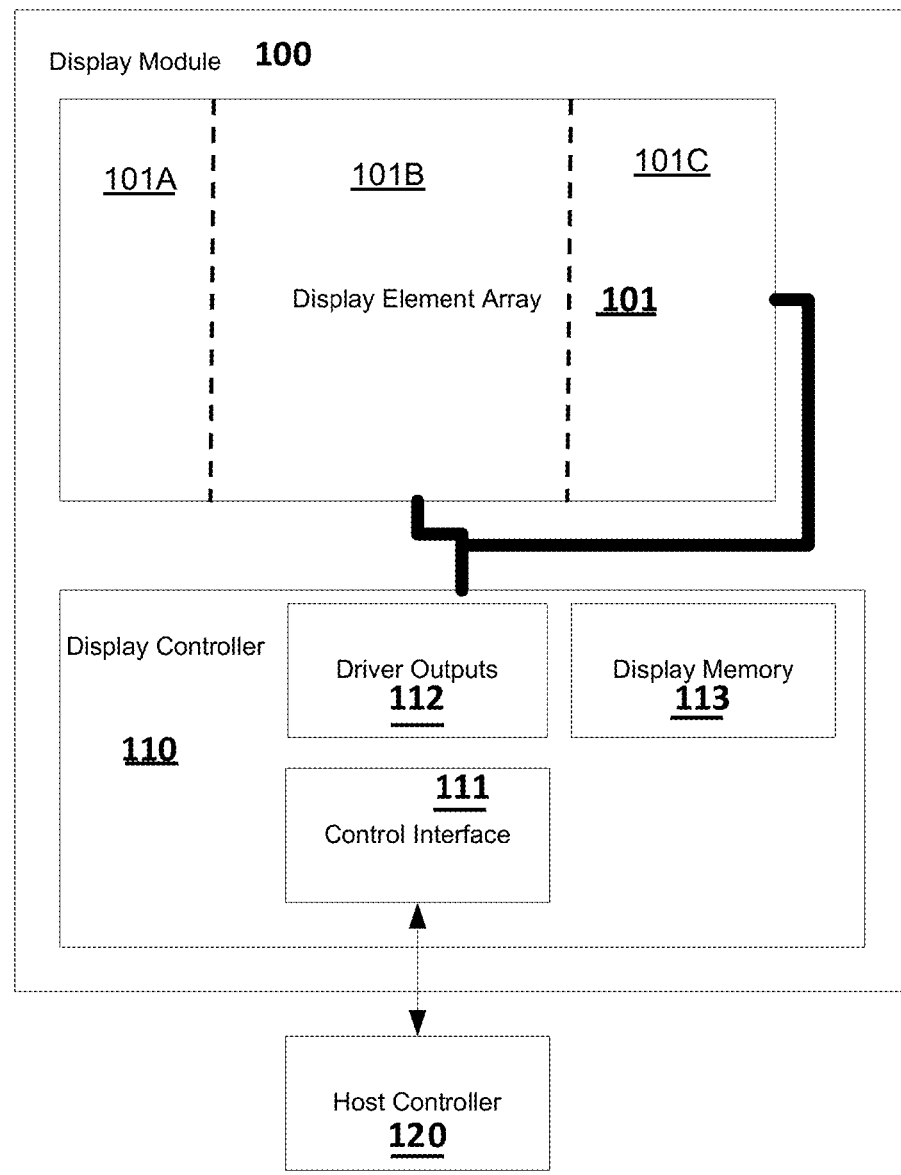
FIG. 1 shows a typical display module 100 with display memory, command interface and the driver outputs.

Referring to FIG. 1, in a typical display module 100, there is a display element array 101 where segments 101A, 101B, 101C are turned on or off by a set of driver outputs 112 according to a set of commands and data received from a host controller 120 through the control interface 111. The status of an element can either be stored in a display memory 113 or it can be stored in the state of the display element itself In one example, the state of a mechanical flip disc and electronic ink element retains its state unless altered. In this prior art display module 100, commands and data are sent to the display module 100 from the host controller 120 in plain text unencrypted form. Therefore, it is possible to deduce the image or text message displayed by looking at the sequence of commands and data.

Figure 2:
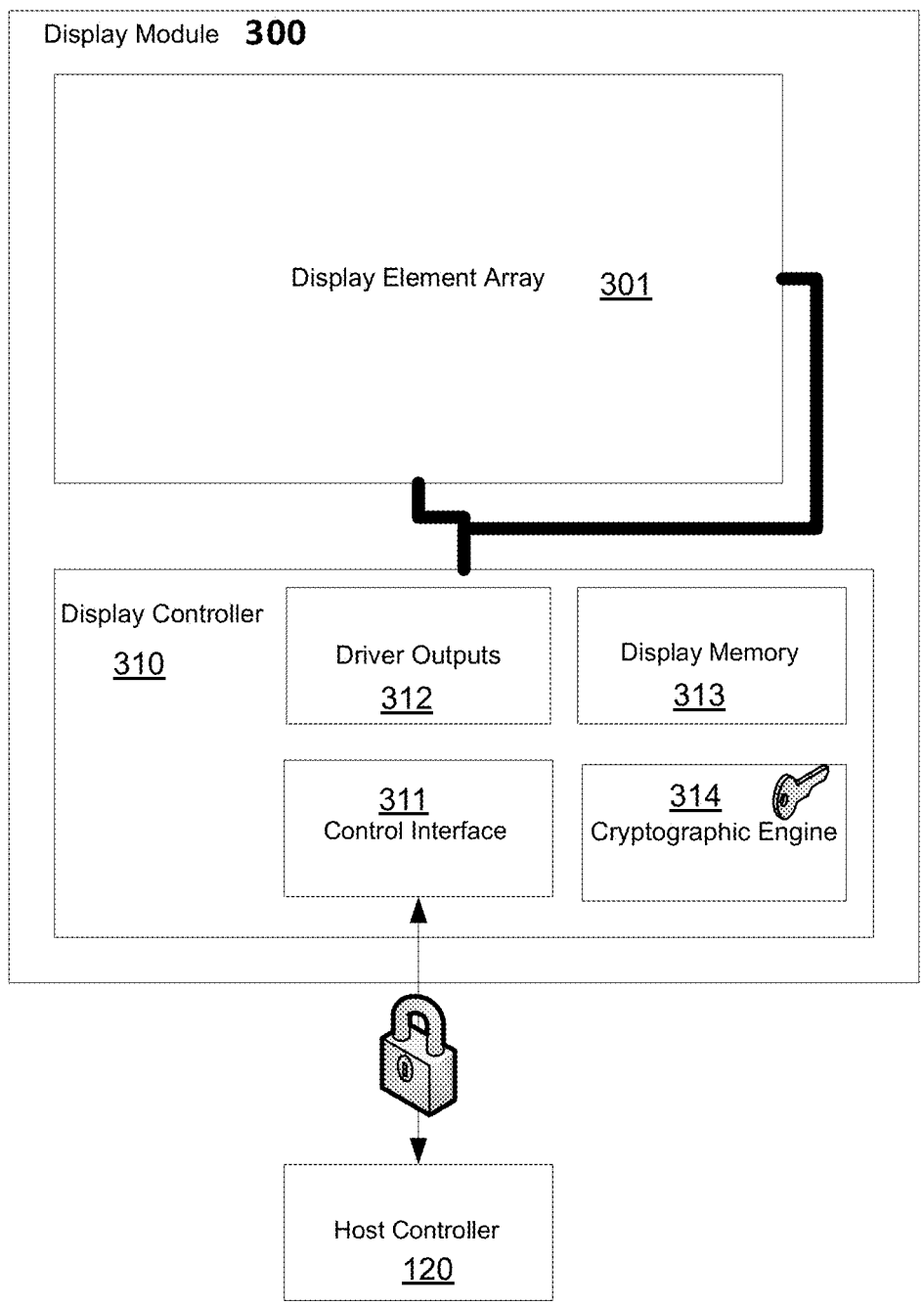
FIG. 2 shows a secure display module 300 according to this invention with display memory, command interface, driver outputs and a cryptographic unit.
Figure 3:
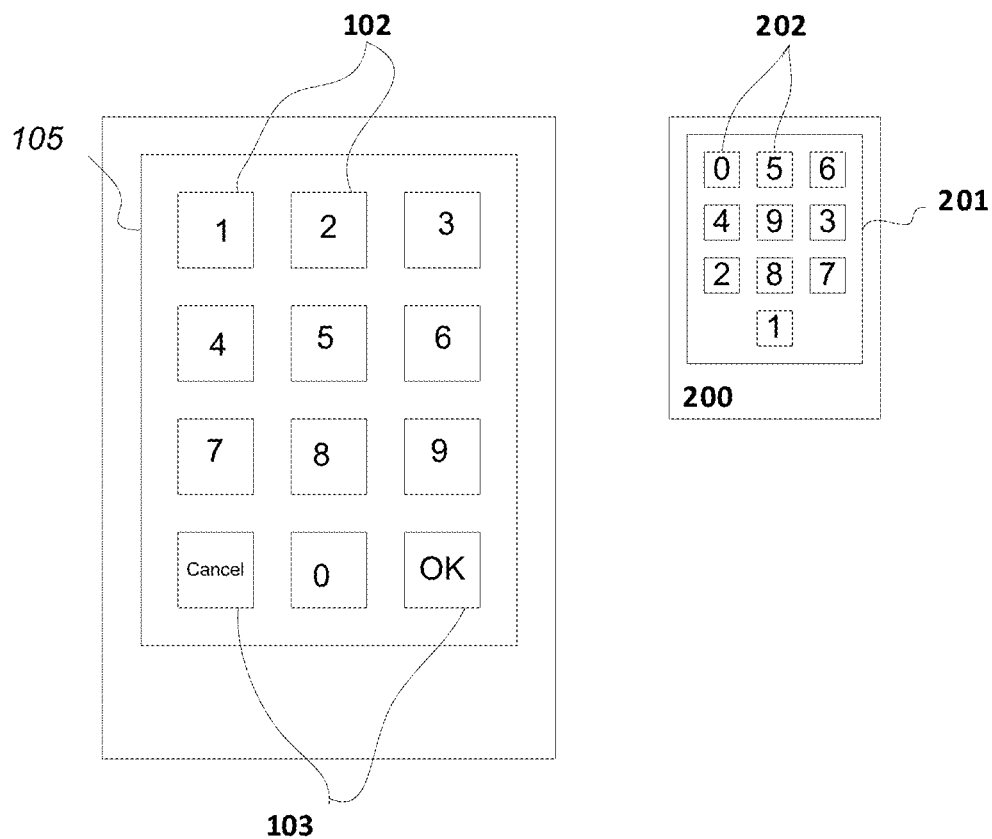
FIG. 3 shows a randomized key grid 201 and its numbered positions 202 shown on the secure display 101 and a standard PIN Pad 105.

In the present invention, commands and data are encrypted so that they are rendered incomprehensible without the proper cryptographic keys. Referring to FIG. 2, display module 300 includes a display element array 301 and a display controller 310. Display controller 310 includes driver outputs 312, a control interface 311, display memory 313 and a cryptographic engine 314. Cryptographic engine 314 provides a secure communication channel between the display controller 310 and the host controller 320. The cryptographic engine 314 stores a set of symmetric or asymmetric cryptographic keys that are used for key exchange, data encryption and data hashing.

In operation, the host controller 1320 and the display controller 310 first establish a key for data encryption. Different key schemes can be used including Fixed key, Master-Session key or Derived Unique Key Per Transaction (DUKPT). Next, data and commands are encrypted by the host controller 320 before sending them to the display controller 310. The display controller 310, upon receiving the encrypted commands and data, decrypts the encrypted commands and data and then carries out the intended operations such as updating the display memory and driver outputs.

One of the applications of the secure display module 300 is in the design of a personal identification number (PIN) entry device. Instead of strengthening the security level of the PIN pad, one can now rely on the security of the display. In the design, a randomized number grid 200 is displayed in display element array 301 and a PIN Pad 105 is used to enter positional information corresponding to the randomized number grid 200 instead of the PIN digits 102. In this way, a PIN can be captured securely in a standard PIN pad, keyboard or touch screen. The positional information, in combination with the displayed information on the secure display module, can give the entered digits and thus the PIN.

Several embodiments of the present invention have been described. Nevertheless, it will be understood that various modifications may be made without departing from the spirit and scope of the invention. Accordingly, other embodiments are within the scope of the following claims.

What is claimed is:
1. A system for a secure display module comprising:
   a display element array comprising one or more segments;
   a display controller comprising driver outputs to drive the one or more segments, respectively;
   a Personal Identification Number (PIN) pad;
   a communication interface;
   a host controller;
   a cryptographic engine to enable performance of cryptographic operations on data,
      the cryptographic operations comprising one or more of data encryption, authentication, digital signature, or hashing,
      wherein the cryptographic engine stores one or more cryptographic keys for the performance of the cryptographic operations,
      said one or more cryptographic keys are symmetric;
   wherein a first portion of the data comprises commands and data to be sent by the host controller to the display controller via the communication interface, and
      the commands and data are encrypted by the host controller before being sent to the display controller; and
   a second portion of the data comprises PIN digits based on positional inputs entered at the PIN pad,
   wherein the encrypted commands and data sent from the host controller are decrypted by the display controller, and information displayed on the display element array is generated from the decrypted commands and data.

2. The system of claim 1, wherein the cryptographic engine stores one or more identification tokens for mutual authentication with the host controller.

3. The system of claim 1, wherein the one or more cryptographic keys comprise one of fixed key, master-session key or Derived Unique Key Per Transaction (DUKPT).

4. The system of claim 1, wherein the display element array further comprises elements comprising light-emitting diodes, seven-segment, fourteen-segment, sixteen-segment display elements, mechanical flip disc display elements and wherein the elements are in the form of pixels, line segments or icons.

5. The system of claim 1, further comprising an application to display a randomized number grid in the display element array, and wherein the positional inputs entered at the PIN pad correspond to the randomized number grid.

6. The system of claim 5, wherein the positional inputs entered at the PIN pad are sent to the display module, and further wherein
   the PIN digits are decoded by the display module, from the entered positional inputs,
   an encrypted PIN is generated based on the PIN digits, and the encrypted PIN is sent back to the PIN pad.

7. A method for a secure display module comprising:
   providing a display element array comprising one or more segments;
   providing a display controller comprising driver outputs to drive the one or more segments, respectively;
   providing a Personal Identification Number (PIN) pad;
   providing a communication interface;
   providing a host controller;
   providing a cryptographic engine to enable performance of cryptographic operations on data,
      said data comprising a first portion of data and a second portion of data,
      the cryptographic operations comprising one or more of data encryption, authentication, digital signature, or hashing,
      wherein the cryptographic engine stores one or more cryptographic keys for the performance of the cryptographic operations, and
      said one or more cryptographic keys are asymmetric;
   encrypting, by the host controller, said first portion of data using the stored one or more cryptographic keys,
      wherein the first portion comprises commands and data to be sent by the host controller to the display controller via the communication interface;
   sending said encrypted first portion of data to the host controller;
   encrypting said second portion of data using the stored one or more cryptographic keys,
      wherein the second portion comprises PIN digits based on positional inputs entered at the PIN pad;
   decrypting, by the display controller, the encrypted commands and data sent from the host controller; and
   displaying, on the display element array, information generated from the decrypted commands and data.

8. The method of claim 7, wherein the cryptographic engine stores one or more identification tokens for mutual authentication with the host controller.

9. The method of claim 7, wherein the one or more cryptographic keys comprise one of fixed key, master-session key or Derived Unique Key Per Transaction (DUKPT).

10. The method of claim 7, wherein the display element array further comprises elements comprising light-emitting diodes, seven-segment, fourteen-segment, sixteen-segment display elements, mechanical flip disc display elements and wherein the elements are in the form of pixels, line segments or icons.

11. The method of claim 7, further comprising providing an application to display a randomized number grid in the display element array, and wherein the positional inputs entered at the PIN pad correspond to the randomized number grid.

12. The method of claim 11, further comprising sending the positional inputs entered at the PIN pad to the display module;
  decoding, at the display module, the entered positional inputs into the PIN digits;
  generating an encrypted PIN based on the encrypting of the second portion of data; and
  sending the encrypted PIN back to the PIN pad.

13. A method for a secure display module comprising:
  providing a display element array comprising one or more segments;
  providing a display controller comprising driver outputs to drive the one or more segments, respectively;
  providing a Personal Identification Number (PIN) pad and an application to display a randomized number grid in the display element array,
    wherein the PIN pad is used to enter positional inputs corresponding to the randomized number grid;
  providing a communication interface;
  providing a host controller;
  sending the positional inputs entered at the PIN pad to the display module;
  decoding, at the display module, the entered positional inputs into PIN digits;
  providing a cryptographic engine to enable performance of cryptographic operations on data,
    said data comprising a first portion of data and a second portion of data,
    the cryptographic operations comprising one or more of data encryption, authentication, digital signature, or hashing,
    wherein the cryptographic engine stores one or more identification tokens for mutual authentication with the host controller,
    wherein the cryptographic engine stores one or more cryptographic keys for the performance of the cryptographic operations, and
    said one or more cryptographic keys are symmetric;
  encrypting, by the host controller, said first portion of data using the stored one or more cryptographic keys,
    wherein the first portion comprises commands and data to be sent by the host controller to the display controller via the communication interface;
  sending, by the host controller, the encrypted first portion of data to the display controller;
  encrypting said second portion of data using the stored one or more cryptographic keys,
    wherein the second portion comprises the PIN digits;
  generating an encrypted PIN based on the encrypting of the second portion of data;
  sending the encrypted PIN back to the PIN pad;
  decrypting, by the display controller, the encrypted commands and data sent from the host controller; and
  displaying, on the display element array, information generated from the decrypted commands and data.

14. A method for a secure display module comprising:
  providing a display element array comprising one or more segments;
  providing a display controller comprising driver outputs to drive the one or more segments, respectively;
  providing a Personal Identification Number (PIN) pad and an application to display a randomized number grid in the display element array,
    wherein the PIN pad is used to enter positional inputs corresponding to the randomized number grid;
  providing a communication interface;
  providing a host controller;
  sending the positional inputs entered at the PIN pad to the display module;
  decoding, at the display module, the entered positional inputs into PIN digits;
  providing a cryptographic engine to enable performance of cryptographic operations on data,
    said data comprising a first portion of data and a second portion of data,
    the cryptographic operations comprising one or more of data encryption, authentication, digital signature, or hashing,
    wherein the cryptographic engine stores one or more identification tokens for mutual authentication with the host controller,
    wherein the cryptographic engine stores one or more cryptographic keys for the performance of the cryptographic operations, and
    said one or more cryptographic keys are asymmetric;
  encrypting, by the host controller, said first portion of data using the stored one or more cryptographic keys,
    wherein the first portion comprises commands and data to be sent by the host controller to the display controller via the communication interface;
  sending, by the host controller, the encrypted first portion of data to the display controller;
  encrypting said second portion of data using the stored one or more cryptographic keys,
    wherein the second portion comprises the PIN digits;
  generating an encrypted PIN based on the encrypting of the second portion of data;
  sending the encrypted PIN back to the PIN pad;
  decrypting, by the display controller, the encrypted commands and data sent from the host controller; and
  displaying, on the display element array, information generated from the decrypted commands and data.

* * * * *